United States Patent
Kronfeld et al.

(10) Patent No.: US 10,684,366 B1
(45) Date of Patent: *Jun. 16, 2020

(54) WEATHER RADAR SYSTEM AND METHOD WITH PATH ATTENUATION SHADOWING

(71) Applicant: Rockwell Collins, Inc., Cedar Rapids, IA (US)

(72) Inventors: Kevin M. Kronfeld, Cedar Rapids, IA (US); Arlen E. Breiholz, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 476 days.

This patent is subject to a terminal disclaimer.

(21) Appl. No.: 15/462,712

(22) Filed: Mar. 17, 2017

Related U.S. Application Data

(63) Continuation of application No. 14/162,035, filed on Jan. 23, 2014, now Pat. No. 9,599,707.

(51) Int. Cl.
| | | |
|---|---|---|
| *G01S 13/95* | (2006.01) | |
| *G06T 11/20* | (2006.01) | |
| *G06T 11/60* | (2006.01) | |
| *G09G 5/30* | (2006.01) | |

(52) U.S. Cl.
CPC .......... *G01S 13/953* (2013.01); *G06T 11/206* (2013.01); *G06T 11/60* (2013.01); *G09G 5/30* (2013.01); *G09G 2320/08* (2013.01); *G09G 2320/10* (2013.01); *G09G 2380/12* (2013.01)

(58) Field of Classification Search
CPC ...... G01S 13/865; G01S 13/867; G01S 13/89; G01S 13/953; G01S 7/04

USPC ...................................................... 342/26 B
See application file for complete search history.

(56) References Cited

U.S. PATENT DOCUMENTS

| | | | |
|---|---|---|---|
| 650,275 | A | 5/1900 | Reeve |
| 3,251,057 | A | 5/1966 | Buehler et al. |
| 3,359,557 | A | 12/1967 | Fow et al. |
| 3,404,396 | A | 10/1968 | Buchler et al. |
| 3,465,339 | A | 9/1969 | Marner |
| 3,491,358 | A | 1/1970 | Hicks et al. |
| 3,508,259 | A | 4/1970 | Andrews |

(Continued)

FOREIGN PATENT DOCUMENTS

| | | |
|---|---|---|
| EP | 1 329 738 B1 | 7/2003 |
| FR | 2658617 A1 | 8/1991 |

(Continued)

OTHER PUBLICATIONS

U.S. Appl. No. 13/246,769, filed Sep. 27, 2011, Rockwell Collins.

(Continued)

*Primary Examiner* — Timothy A Brainard
(74) *Attorney, Agent, or Firm* — Donna P. Suchy

(57) ABSTRACT

An avionic weather radar system and method can sense a path attenuation condition using radar returns of received via a radar antenna onboard the aircraft. Images of weather can be displayed using an outside source and the radar returns. The images are displayed using information from the outside source when the path attenuation condition is sensed. The images can be displayed using speckled areas, cross hatched areas or other symbols to represent the information from the outside source. The images of the weather can be provided on an avionic display.

20 Claims, 8 Drawing Sheets

(56) References Cited

U.S. PATENT DOCUMENTS

| | | |
|---|---|---|
| 3,540,829 A | 11/1970 | Collinson et al. |
| 3,567,915 A | 3/1971 | Altshuler et al. |
| 3,646,555 A | 2/1972 | Atlas |
| 3,715,748 A | 2/1973 | Hicks |
| 3,764,719 A | 10/1973 | Dell |
| 3,781,530 A | 12/1973 | Britland et al. |
| 3,781,878 A | 12/1973 | Kirkpatrick |
| 3,803,609 A | 4/1974 | Lewis et al. |
| 3,885,237 A | 5/1975 | Kirkpatrick |
| 3,943,511 A | 3/1976 | Evans et al. |
| 3,964,064 A | 6/1976 | Brandao et al. |
| 3,968,490 A | 7/1976 | Gostin |
| 4,015,257 A | 3/1977 | Fetter |
| 4,043,194 A | 8/1977 | Tanner |
| 4,179,693 A | 12/1979 | Evans et al. |
| 4,223,309 A | 9/1980 | Payne |
| 4,240,108 A | 12/1980 | Levy |
| 4,283,715 A | 8/1981 | Choisnet |
| 4,283,725 A | 8/1981 | Chisholm |
| 4,318,100 A | 3/1982 | Shimizu et al. |
| 4,346,595 A | 8/1982 | Frosch et al. |
| 4,430,654 A | 2/1984 | Kupfer |
| 4,435,707 A | 3/1984 | Clark |
| 4,459,592 A | 7/1984 | Long |
| 4,533,915 A | 8/1985 | Lucchi et al. |
| 4,555,703 A | 11/1985 | Cantrell |
| 4,600,925 A | 7/1986 | Alitz et al. |
| 4,613,938 A | 9/1986 | Hansen et al. |
| 4,649,388 A | 3/1987 | Atlas |
| 4,658,255 A | 4/1987 | Nakamura et al. |
| 4,684,950 A | 8/1987 | Long |
| 4,742,353 A | 5/1988 | D'Addio et al. |
| 4,761,650 A | 8/1988 | Masuda et al. |
| 4,835,536 A | 5/1989 | Piesinger et al. |
| RE33,152 E | 1/1990 | Atlas |
| 4,914,444 A | 4/1990 | Pifer et al. |
| 4,928,131 A | 5/1990 | Onozawa |
| 4,940,987 A | 7/1990 | Frederick |
| 5,036,334 A | 7/1991 | Henderson et al. |
| 5,047,775 A | 9/1991 | Alitz |
| 5,049,886 A | 9/1991 | Seitz et al. |
| 5,057,820 A | 10/1991 | Markson et al. |
| 5,077,558 A | 12/1991 | Kuntman |
| 5,105,191 A | 4/1992 | Keedy |
| 5,159,407 A | 10/1992 | Churnside et al. |
| 5,164,731 A | 11/1992 | Borden et al. |
| 5,173,704 A | 12/1992 | Buehler et al. |
| 5,177,487 A | 1/1993 | Taylor et al. |
| 5,198,819 A | 3/1993 | Susnjara |
| 5,202,690 A | 4/1993 | Frederick |
| 5,208,600 A | 5/1993 | Rubin |
| 5,221,924 A | 6/1993 | Wilson, Jr. |
| 5,262,773 A | 11/1993 | Gordon |
| 5,291,208 A | 3/1994 | Young |
| 5,296,865 A | 3/1994 | Lewis |
| 5,311,183 A | 5/1994 | Mathews et al. |
| 5,311,184 A | 5/1994 | Kuntman |
| 5,331,330 A | 7/1994 | Susnjara |
| 5,396,220 A | 3/1995 | Markson et al. |
| 5,402,116 A | 3/1995 | Ashley |
| 5,469,168 A | 11/1995 | Anderson |
| 5,479,173 A | 12/1995 | Yoshioka et al. |
| 5,485,157 A | 1/1996 | Long |
| 5,517,193 A | 5/1996 | Allison et al. |
| 5,521,603 A | 5/1996 | Young |
| 5,534,868 A | 7/1996 | Gjessing et al. |
| 5,568,151 A | 10/1996 | Merritt |
| 5,583,972 A | 12/1996 | Miller |
| 5,592,171 A | 1/1997 | Jordan |
| 5,602,543 A | 2/1997 | Prata et al. |
| 5,615,118 A | 3/1997 | Frank |
| 5,648,782 A | 7/1997 | Albo et al. |
| 5,654,700 A | 8/1997 | Prata et al. |
| 5,657,009 A | 8/1997 | Gordon |
| 5,686,919 A | 11/1997 | Jordan et al. |
| 5,726,656 A | 3/1998 | Frankot |
| 5,757,322 A | 5/1998 | Ray et al. |
| 5,771,020 A | 6/1998 | Markson et al. |
| 5,828,332 A | 10/1998 | Frederick |
| 5,838,239 A | 11/1998 | Stern et al. |
| 5,839,080 A | 11/1998 | Muller et al. |
| 5,907,568 A | 5/1999 | Reitan, Jr. |
| 5,920,276 A | 7/1999 | Frederick |
| 5,945,926 A | 8/1999 | Ammar et al. |
| 5,973,635 A | 10/1999 | Albo |
| 6,034,760 A | 3/2000 | Rees |
| 6,043,756 A | 3/2000 | Bateman et al. |
| 6,043,757 A | 3/2000 | Patrick |
| 6,081,220 A | 6/2000 | Fujisaka et al. |
| 6,138,060 A | 10/2000 | Conner et al. |
| 6,154,151 A | 11/2000 | McElreath et al. |
| 6,154,169 A | 11/2000 | Kuntman |
| 6,177,873 B1 | 1/2001 | Cragun |
| 6,184,816 B1 | 2/2001 | Zheng et al. |
| 6,201,494 B1 | 3/2001 | Kronfeld |
| 6,208,284 B1 | 3/2001 | Woodell et al. |
| 6,236,351 B1 | 5/2001 | Conner et al. |
| 6,240,369 B1 | 5/2001 | Foust |
| 6,246,367 B1 | 6/2001 | Markson et al. |
| 6,281,832 B1 | 8/2001 | McElreath |
| 6,289,277 B1 | 9/2001 | Feyereisen et al. |
| 6,297,772 B1 | 10/2001 | Lewis |
| 6,339,747 B1 | 1/2002 | Daly et al. |
| 6,340,946 B1 | 1/2002 | Wolfson et al. |
| 6,381,538 B1 | 4/2002 | Robinson et al. |
| 6,384,830 B2 | 5/2002 | Baron et al. |
| 6,388,607 B1 | 5/2002 | Woodell |
| 6,388,608 B1 | 5/2002 | Woodell et al. |
| RE37,725 E | 6/2002 | Yamada |
| 6,405,134 B1 | 6/2002 | Smith et al. |
| 6,424,288 B1 | 7/2002 | Woodell |
| 6,441,773 B1 | 8/2002 | Kelly et al. |
| 6,456,226 B1 | 9/2002 | Zheng et al. |
| 6,480,142 B1 | 11/2002 | Rubin |
| 6,496,252 B1 | 12/2002 | Whiteley |
| 6,501,392 B2 | 12/2002 | Gremmert et al. |
| 6,512,476 B1 | 1/2003 | Woodell |
| 6,518,914 B1 | 2/2003 | Peterson et al. |
| 6,549,161 B1 | 4/2003 | Woodell |
| 6,560,538 B2 | 5/2003 | Schwinn et al. |
| 6,563,452 B1 | 5/2003 | Zheng et al. |
| 6,577,947 B1 | 6/2003 | Kronfeld et al. |
| 6,590,520 B1 | 7/2003 | Steele et al. |
| 6,597,305 B2 | 7/2003 | Szeto et al. |
| 6,603,425 B1 | 8/2003 | Woodell |
| 6,606,564 B2 | 8/2003 | Schwinn et al. |
| 6,614,382 B1 | 9/2003 | Cannaday et al. |
| 6,650,275 B1 | 11/2003 | Kelly et al. |
| 6,650,972 B1 | 11/2003 | Robinson et al. |
| 6,667,710 B2 | 12/2003 | Cornell et al. |
| 6,670,908 B2 | 12/2003 | Wilson et al. |
| 6,677,886 B1 | 1/2004 | Lok |
| 6,683,609 B1 | 1/2004 | Baron et al. |
| 6,690,317 B2 | 2/2004 | Szeto et al. |
| 6,703,945 B2 | 3/2004 | Kuntman et al. |
| 6,720,906 B2 | 4/2004 | Szeto et al. |
| 6,738,010 B2 | 5/2004 | Steele et al. |
| 6,741,203 B1 | 5/2004 | Woodell |
| 6,744,382 B1 | 6/2004 | Lapis et al. |
| 6,771,207 B1 | 8/2004 | Lang |
| 6,788,043 B2 | 9/2004 | Murphy et al. |
| 6,791,311 B2 | 9/2004 | Murphy et al. |
| 6,828,922 B1 | 12/2004 | Gremmert et al. |
| 6,828,923 B2 | 12/2004 | Anderson |
| 6,839,018 B2 | 1/2005 | Szeto et al. |
| 6,850,185 B1 | 2/2005 | Woodell |
| 6,856,908 B2 | 2/2005 | Devarasetty et al. |
| 6,879,280 B1 | 4/2005 | Bull et al. |
| 6,882,302 B1 | 4/2005 | Woodell et al. |
| 6,917,860 B1 | 7/2005 | Robinson et al. |
| 6,977,608 B1 | 12/2005 | Anderson et al. |
| 7,030,805 B2 | 4/2006 | Ormesher et al. |
| 7,039,505 B1 | 5/2006 | Southard et al. |
| 7,042,387 B2 | 5/2006 | Ridenour et al. |

(56) References Cited

U.S. PATENT DOCUMENTS

| | | |
|---|---|---|
| 7,082,382 B1 | 7/2006 | Rose et al. |
| 7,109,912 B1 | 9/2006 | Paramore et al. |
| 7,109,913 B1 | 9/2006 | Paramore et al. |
| 7,116,266 B1 | 10/2006 | Vesel et al. |
| 7,129,885 B1 | 10/2006 | Woodell et al. |
| 7,132,974 B1 | 11/2006 | Christianson |
| 7,139,664 B2 | 11/2006 | Kelly et al. |
| 7,145,503 B2 | 12/2006 | Abramovich et al. |
| 7,161,525 B1 | 1/2007 | Finley et al. |
| 7,200,491 B1 | 4/2007 | Rose et al. |
| 7,205,928 B1 | 4/2007 | Sweet |
| 7,242,343 B1 | 7/2007 | Woodell |
| 7,259,714 B1 | 8/2007 | Cataldo |
| 7,292,178 B1 | 11/2007 | Woodell et al. |
| 7,307,576 B1 | 12/2007 | Koenigs |
| 7,307,577 B1 | 12/2007 | Kronfeld et al. |
| 7,307,583 B1 | 12/2007 | Woodell et al. |
| 7,307,586 B2 | 12/2007 | Peshlov et al. |
| 7,307,756 B2 | 12/2007 | Walmsley |
| 7,352,317 B1 | 4/2008 | Finley et al. |
| 7,352,929 B2 | 4/2008 | Hagen et al. |
| 7,365,674 B2 | 4/2008 | Tillotson et al. |
| 7,372,394 B1 | 5/2008 | Woodell et al. |
| 7,383,131 B1 | 6/2008 | Wey et al. |
| 7,417,579 B1* | 8/2008 | Woodell .............. G01S 7/41 |
| | | 342/26 B |
| 7,427,943 B1 | 9/2008 | Kronfeld et al. |
| 7,436,361 B1 | 10/2008 | Paulsen et al. |
| 7,471,995 B1 | 12/2008 | Robinson |
| 7,486,219 B1 | 2/2009 | Woodell et al. |
| 7,486,220 B1 | 2/2009 | Kronfeld et al. |
| 7,492,304 B1 | 2/2009 | Woodell et al. |
| 7,492,305 B1 | 2/2009 | Woodell et al. |
| 7,515,087 B1 | 4/2009 | Woodell et al. |
| 7,515,088 B1 | 4/2009 | Woodell et al. |
| 7,528,613 B1 | 5/2009 | Thompson et al. |
| 7,541,971 B1 | 6/2009 | Woodell et al. |
| 7,557,735 B1 | 7/2009 | Woodell et al. |
| 7,576,680 B1 | 8/2009 | Woodell |
| 7,581,441 B2 | 9/2009 | Barny et al. |
| 7,598,901 B2 | 10/2009 | Tillotson et al. |
| 7,598,902 B1 | 10/2009 | Woodell et al. |
| 7,633,428 B1 | 12/2009 | McCusker et al. |
| 7,633,431 B1 | 12/2009 | Wey et al. |
| 7,664,601 B2 | 2/2010 | Daly, Jr. |
| 7,696,920 B1* | 4/2010 | Finley .................. G01S 7/062 |
| | | 342/26 B |
| 7,696,921 B1 | 4/2010 | Finley et al. |
| 7,698,058 B2 | 4/2010 | Chen et al. |
| 7,714,767 B1 | 5/2010 | Kronfeld et al. |
| 7,728,758 B2 | 6/2010 | Varadarajan et al. |
| 7,733,264 B1 | 6/2010 | Woodell et al. |
| 7,859,448 B1 | 12/2010 | Woodell et al. |
| 7,868,811 B1 | 1/2011 | Woodell et al. |
| 7,869,953 B1 | 1/2011 | Kelly et al. |
| 7,917,255 B1 | 3/2011 | Finley |
| 7,932,853 B1 | 4/2011 | Woodell et al. |
| 7,973,698 B1 | 7/2011 | Woodell et al. |
| 7,982,658 B2 | 7/2011 | Kauffman et al. |
| 8,022,859 B2 | 9/2011 | Bunch et al. |
| 8,054,214 B2 | 11/2011 | Bunch |
| 8,072,368 B1 | 12/2011 | Woodell |
| 8,081,106 B2 | 12/2011 | Yannone |
| 8,089,391 B1 | 1/2012 | Woodell et al. |
| 8,098,188 B2 | 1/2012 | Costes et al. |
| 8,098,189 B1 | 1/2012 | Woodell et al. |
| 8,111,186 B2 | 2/2012 | Bunch et al. |
| 8,159,369 B1 | 4/2012 | Koenigs et al. |
| 8,217,828 B2 | 7/2012 | Kirk |
| 8,228,227 B2 | 7/2012 | Bunch et al. |
| 8,314,730 B1 | 11/2012 | Musiak et al. |
| 8,332,084 B1 | 12/2012 | Bailey et al. |
| 8,902,100 B1 | 12/2014 | Woodell et al. |
| 9,019,146 B1 | 4/2015 | Finley et al. |
| 9,134,418 B1 | 9/2015 | Kronfeld et al. |
| 9,507,022 B1 | 11/2016 | Breiholz et al. |
| 9,535,158 B1 | 1/2017 | Breiholz et al. |
| 9,599,707 B1* | 3/2017 | Kronfeld .............. G01S 13/953 |
| 2002/0039072 A1 | 4/2002 | Gremmert et al. |
| 2002/0126039 A1 | 9/2002 | Dalton et al. |
| 2003/0001770 A1 | 1/2003 | Cornell et al. |
| 2003/0025627 A1 | 2/2003 | Wilson et al. |
| 2003/0193411 A1 | 10/2003 | Price |
| 2004/0183695 A1 | 9/2004 | Ruokangas et al. |
| 2004/0239550 A1* | 12/2004 | Daly, Jr. .............. G01S 13/723 |
| | | 342/26 B |
| 2005/0049789 A1 | 3/2005 | Kelly et al. |
| 2005/0174350 A1* | 8/2005 | Ridenour ............. G08G 5/0013 |
| | | 345/440 |
| 2005/0222770 A1 | 10/2005 | McKewon et al. |
| 2006/0036366 A1 | 2/2006 | Kelly et al. |
| 2007/0005249 A1 | 1/2007 | Dupree et al. |
| 2008/0040038 A1 | 2/2008 | Southard et al. |
| 2008/0158048 A1* | 7/2008 | Ridenour ............. G08G 5/0013 |
| | | 342/26 B |
| 2008/0158049 A1 | 7/2008 | Southard et al. |
| 2009/0177343 A1 | 7/2009 | Bunch et al. |
| 2009/0219197 A1 | 9/2009 | Bunch |
| 2010/0019938 A1 | 1/2010 | Bunch |
| 2010/0042275 A1 | 2/2010 | Kirk |
| 2010/0194628 A1 | 8/2010 | Christianson et al. |
| 2010/0201565 A1 | 8/2010 | Khatwa |
| 2010/0245164 A1* | 9/2010 | Kauffman ................ G01S 7/22 |
| | | 342/26 B |
| 2010/0245165 A1* | 9/2010 | Kauffman ............. G01S 13/953 |
| | | 342/26 B |
| 2010/0302093 A1* | 12/2010 | Bunch ................ H04B 7/18506 |
| | | 342/26 B |
| 2010/0302094 A1* | 12/2010 | Bunch .................. G01S 13/953 |
| | | 342/26 D |
| 2010/0328143 A1 | 12/2010 | Kirk |
| 2010/0332056 A1 | 12/2010 | Kirk |
| 2011/0074624 A1* | 3/2011 | Bunch .................... G01S 7/003 |
| | | 342/26 D |
| 2011/0148692 A1 | 6/2011 | Christianson |
| 2011/0148694 A1 | 6/2011 | Bunch et al. |
| 2012/0029786 A1 | 2/2012 | Calandra et al. |
| 2012/0086596 A1 | 4/2012 | Insanic et al. |
| 2012/0133551 A1 | 5/2012 | Pujol et al. |
| 2012/0139778 A1 | 6/2012 | Bunch et al. |
| 2013/0226452 A1 | 8/2013 | Watts |
| 2013/0234884 A1 | 9/2013 | Bunch et al. |
| 2013/0321442 A1 | 12/2013 | Van Os et al. |
| 2013/0345982 A1 | 12/2013 | Liu et al. |
| 2014/0156133 A1 | 6/2014 | Cullinane et al. |
| 2014/0176362 A1 | 6/2014 | Sneed |
| 2014/0362088 A1 | 12/2014 | Veillette et al. |

FOREIGN PATENT DOCUMENTS

| | | |
|---|---|---|
| WO | WO-98/07047 A1 | 2/1998 |
| WO | WO-98/22834 A1 | 5/1998 |
| WO | WO-03/005060 A1 | 1/2003 |
| WO | WO-2009/137158 | 11/2009 |

OTHER PUBLICATIONS

U.S. Appl. No. 13/717,052, filed Dec. 17, 2012, Woodell et al.
U.S. Appl. No. 13/837,538, filed Mar. 15, 2013, Kronfeld et al.
U.S. Appl. No. 13/841,893, filed Mar. 15, 2013, Rockwell Collins, Inc.
U.S. Appl. No. 13/919,406, filed Jun. 17, 2013, Rockwell Collins, Inc.
U.S. Appl. No. 14/086,844, filed Nov. 21, 2013, Rockwell Collins, Inc.
U.S. Appl. No. 14/162,035, filed Jan. 23, 2014, Kevin M. Kronfeld et al.
U.S. Appl. No. 14/206,239, filed Mar. 12, 2014, Rockwell Collins.
U.S. Appl. No. 14/206,651, filed Mar. 12, 2014, Rockwell Collins, Inc.
U.S. Appl. No. 14/207,034, filed Mar. 12, 2014, Rockwell Collins, Inc.

(56) References Cited

OTHER PUBLICATIONS

U.S. Appl. No. 14/323,766, filed Jul. 3, 2014, Weichbrod et al.
U.S. Appl. No. 14/465,730, filed Aug. 21, 2014, Breiholz et al.
U.S. Appl. No. 14/465,753, filed Aug. 21, 2014, Arlen E. Breiholz et al.
U.S. Appl. No. 14/608,071, filed Jan. 28, 2015, Breiholz et al.
3-D Weather Hazard and Avoidance System, Honeywell InteVue Brochure dated Nov. 2008, 4 pages.
Boudevillain et al., 2003, Assessment of Vertically Integrated Liquid (VIL) Water Content Radar Measurement, J. Atmos. Oceanic Technol., 20, 807-819.
Bovith et al., Detecting Weather Radar Clutter by Information Fusion with Satellite Images and Numerical Weather Prediction Model Output; Jul. 31-Aug. 4, 2006, 4 pages.
Burnham et al., Thunderstorm Turbulence and Its Relationship to Weather Radar Echoes, J. Aircraft, Sep.-Oct. 1969, 8 pages.
Corridor Integrated Weather System (CIWS), www.ll.mit.edu/mission/aviation/faawxsystems/ciws.html, received on Aug. 19, 2009, 3 pages.
Decision on Appeal for Inter Parties Reexamination Control No. 95/001,860, dated Oct. 17, 2014, 17 pages.
Doviak et al., Doppler Radar and Weather Observations, 1984, 298 pages.
Dupree et al., FAA Tactical Weather Forecasting in the United States National Airspace, Proceedings from the World Weather Research Symposium on Nowcasting and Very Short Term Forecasts, Toulouse, France, 2005, 29 pages.
Final Office Action on U.S. Appl. No. 12/892,663 dated Mar. 7, 2013, 13 pages.
Final Office Action on U.S. Appl. No. 13/238,606 dated Apr. 1, 2014, 11 pages.
Final Office Action on U.S. Appl. No. 13/238,606 dated Jan. 22, 2015, 6 pages.
Final Office Action on U.S. Appl. No. 13/246,769 dated Sep. 16, 2014, 18 pages.
Goodman et al., LISDAD Lightning Observations during the Feb. 22-23, 1998 Central Florida Tornado Outbreak, http:www.srh.noaa.gov/topics/attach/html/ssd98-37.htm, Jun. 1, 1998, 5 pages.
Greene et al., Vertically Integrated Liquid Water—A New Analysis Tool, Monthly Weather Review, Jul. 1972, 5 pages.
Hodanish, Integration of Lightning Detection Systems in a Modernized National Weather Service Office, http://www.srh.noaa.gov/mlb/hoepub.html, retrieved on Aug. 6, 2007, 5 pages.
Honeywell, RDR-4B Forward Looking Windshear Detection/Weather Radar System User's Manual with Radar Operation Guidelines, Jul. 2003, 106 pages.
Keith, Transport Category Airplane Electronic Display Systems, Jul. 16, 1987, 34 pages.
Klingle-Wilson et al., Description of Corridor Integrated Weather System (CIWS) Weather Products, Aug. 1, 2005, 120 pages.
Kuntman et al, Turbulence Detection and Avoidance System, Flight Safety Foundation 53rd International Air Safety Seminar (IASS), Oct. 29, 2000.
Kuntman, Airborne System to Address Leading Cause of Injuries in Non-Fatal Airline Accidents, ICAO Journal, Mar. 2000.
Kuntman, Satellite Imagery: Predicting Aviation Weather Hazards, ICAO Journal, Mar. 2000, 4 pps.
Lahiff, 2005, Vertically Integrated Liquid Density and Its Associated Hail Size Range Across the Burlington, Vermont County Warning Area, Eastern Regional Technical Attachment, No. 05-01, 20 pages.
Liu, Chuntao et al., Relationships between lightning flash rates and radar reflectivity vertical structures in thunderstorms over the tropics and subtropics, Journal of Geophysical Research, vol. 177, D06212, doi:10.1029/2011JDo17123,2012, American Geophysical Union, Mar. 27, 2012, 19 pages.
Meteorological/KSC/L71557/Lighting Detection and Ranging (LDAR), Jan. 2002, 12 pages.
Nathanson, Fred E., "Radar and Its Composite Environment," Radar Design Principles, Signal Processing and the Environment, 1969, 5 pages, McGraw-Hill Book Company, New York et al.
Non-Final Office Action on U.S. Appl. No. 13/238,606 dated May 27, 2015, 14 pages.
Non-Final Office Action on U.S. Appl. No. 14/452,235 dated Apr. 23, 2015, 9 pages.
Non-Final Office Action on U.S. Appl. No. 14/681,901 dated Jun. 17, 2015, 21 pages.
Non-Final Office Action on U.S. Appl. No. 12/892,663 dated May 29, 2013, 14 pages.
Non-Final Office Action on U.S. Appl. No. 13/238,606 dated Jul. 8, 2014, 12 pages.
Non-Final Office Action on U.S. Appl. No. 13/238,606 dated Mar. 27, 2015, 21 pages.
Non-Final Office Action on U.S. Appl. No. 13/238,606 dated Sep. 23, 2013, 15 pages.
Non-Final Office Action on U.S. Appl. No. 13/717,052 dated Feb. 11, 2015, 15 pages.
Non-Final Office Action on U.S. Appl. No. 13/717,052 dated Sep. 9, 2014, 8 pages.
Non-Final Office Action on U.S. Appl. No. 13/841,893 dated Jun. 22, 2015, 27 pages.
Non-Final Office Action on U.S. Appl. No. 13/913,100 dated May 4, 2015, 25 pages.
Non-Final Office Action on U.S. Appl. No. 13/919,406 dated Jul. 14, 2015, 23 pages.
Non-Final Office Action on U.S. Appl. No. 14/162,035 dated Jul. 11, 2016, 10 pages.
Non-Final Office Action on U.S. Appl. No. 14/162,035, dated Feb. 4, 2016, 9 pages.
Non-Final Office Action on U.S. Appl. No. 14/323,766, dated Feb. 8, 2017, 21 pages.
Non-Final Office Action on U.S. Appl. No. 14/465,753, dated Apr. 4, 2016, 12 pages.
Non-Final Office Action on U.S. Appl. No. 14/608,071, dated Jan. 23, 2017, 15 pages.
Non-Final Office Action on U.S. Appl. No. 14/086,844, dated Nov. 10, 2015, 17 pages.
Notice of Allowability on U.S. Appl. No. 14/162,035, dated Feb. 17, 2017, 2 pages.
Notice of Allowance on U.S. Appl. No. 12/075,103 dated Aug. 4, 2014, 10 pages.
Notice of Allowance on U.S. Appl. No. 13/246,769 dated Jan. 8, 2015, 10 pages.
Notice of Allowance on U.S. Appl. No. 13/707,438 dated Feb. 25, 2015, 11 pages.
Notice of Allowance on U.S. Appl. No. 14/162,035, dated Nov. 9, 2016, 7 pages.
Notice of Allowance on U.S. Appl. No. 14/465,730, dated Feb. 28, 2017, 5 pages.
Notice of Allowance on U.S. Appl. No. 14/608,071, dated Aug. 31, 2017, 9 pages.
Notice of Allowance on U.S. Appl. No. 14/681,901, dated Dec. 23, 2015, 8 pages.
Office Action for U.S. Appl. No. 12/892,663, dated Oct. 22, 2012, 12 pages.
Office Action for U.S. Appl. No. 13/717,052, dated Aug. 22, 2013, 15 pages.
Office Action on U.S. Appl. No. 12/075,103 dated Jul. 31, 2013, 8 pages.
Office Action on U.S. Appl. No. 13/246,769 dated Apr. 21, 2014, 18 pages.
Pessi et al., On the Relationship Between Lightning and Convective Rainfall Over the Central Pacific Ocean, date unknown, 9 pages.
Robinson et al., En Route Weather Depiction Benefits of the Nexrad Vertically Integrated Liquid Water Product Utilized by the Corridor Integrated Weather System, 10th Conference on Aviation, Range, and Aerospace Meteorology (ARAM), 2002, 4 pages.
Stormscope Lightning Detection Systems, L3 Avionics Systems, retrieved on Jul. 11, 2011, 6 pages.
TOA Technology, printed from website: http://www.toasystems.com/technology.html on Dec. 29, 2010, 2 pages.

(56) References Cited

OTHER PUBLICATIONS

Triangulation, from Wikipedia, printed from website: http://en.wikipedia.org/wiki/Triangulation on Dec. 29, 2010, 6 pages.
Waldvogel et al., The Kinetic Energy of Hailfalls. Part I: Hailstone Spectra, Journal of Applied Meteorology, Apr. 1978, 8 pages.
Wilson et al., The Complementary Use of Titan-Derived Radar and Total Lightning Thunderstorm Cells, paper presented on Oct. 16, 2005, 10 pages.
Zipser et al., The Vertical Profile of Radar Reflectivity and Convective Cells: A Strong Indicator of Storm Intensity and Lightning Probability? America Meteorological Society, 1994, 9 pages.
Notice of Allowance for U.S. Appl. No. 14/872,942 dated Jan. 17, 2019.
Notice of Allowance for U.S. Appl. No. 14/323,766 dated Jun. 19, 2017. 7 pages.
Non-Final Office Action for U.S. Appl. No. 14/872,942 dated Oct. 6, 2017. 15 pages.
Corrected Notice of Allowance for U.S. Appl. No. 14/608,071 dated Dec. 15, 2017. 3 pages.
Final Office Action for U.S. Appl. No. 14/872,942 dated Jun. 1, 2018. 17 pages.

\* cited by examiner

WEATHER RADAR SYSTEM AND METHOD WITH PATH ATTENUATION SHADOWING

CROSS-REFERENCE TO RELATED PATENT APPLICATIONS

This application is a continuation of U.S. Pat. No. 9,599,707, filed Jan. 23, 2014, which is incorporated herein by reference in its entirety and for all purposes.

BACKGROUND

The present disclosure relates generally to the field of weather display systems. More particularly, the present disclosure relates to a weather display system and method configured to display weather which is obscured by path attenuation.

Weather display systems are often used to alert operators of vehicles, such as aircraft pilots, of weather hazards in the area near the vehicle. Conventional weather display systems are configured to display weather data in two dimensions and often operate according to ARINC 453 and 708 standards. A horizontal plan view provides an overview of weather patterns near an aircraft mapped onto a horizontal plane. Generally the horizontal plan view provides indications of precipitation rates in the vicinity of the aircraft (images of weather). Red, yellow, and green colors are used to symbolize areas of respective precipitation rates, and black color symbolizes areas of very little or no precipitation. Each color is associated with radar reflectivity range which corresponds to a respective precipitation rate range. Red indicates the highest rates of precipitation while green represents the lowest (non-zero) rates of precipitation. Certain displays can also utilize a magenta color to indicate regions of turbulence.

Onboard avionic weather radar systems (e.g., x-band weather radar systems) cannot always penetrate or sense areas beyond intense precipitation or rainfall. Accordingly, cells (e.g. storms) behind a nearby line of cells may be shadowed by the closer cells. This shadowing by the closer cells can deprive the pilot of a view of the complete weather situation through which the aircraft is flying. Conventional avionic weather radar systems such as the WX2100 weather radar manufactured by Rockwell Collins, Inc. can execute a path attenuation compensation (PAC) algorithm that flags any radial where the radar return is too badly attenuated to be corrected. Path attenuation is described in U.S. Pat. No. 5,047,775 incorporated herein by reference Conventional displays can mark such radials with a yellow bar and/or provide the text "PAC Alert" so that the pilot can be aware that hidden weather may be behind displayed weather cells. However, such systems do not provide an indication of whether or not weather actually exists behind the weather cell or what type of weather exists behind a weather cell.

Thus, there is a need for a weather information display that provides more information than a conventional display. Further, there is a need for a threat depiction system and method that can augment the display of information when weather detection is obscured by path attenuation. Further still, there is a need for an avionic weather system including a path attenuation algorithm that provides an indication of weather beyond the attenuating cell. Yet further, there is a need for a system and method that displays weather despite path attenuation issues. Yet further, there is a need for a weather display that can display weather images using merged data from two different sources.

SUMMARY

An exemplary embodiment relates to a method of displaying images associated with weather near an aircraft. The method includes sensing a path attenuation condition using the radar returns and displaying the images of the weather using an outside source and the radar returns. The images of the weather are displayed using information from the outside source when the path attenuation condition is sensed.

Another exemplary embodiment relates to an avionic weather radar system. The avionic weather radar system includes a processor configured to sense a path attenuation condition using radar returns received via a radar antenna onboard the aircraft. The processor is also configured to cause images of weather to be displayed using outside source and the radar returns. The weather is displayed using information from the outside source when the path attenuation condition is sensed.

According to certain embodiments outside sources can be another weather radar source or data from the onboard weather radar system operating at a different frequency. In other embodiments, the outside source can be a non-radar airborne source, a light detection and r ranging (LIDAR) source, an infrared source (e.g., infrared sensor/camera), etc.).

Another embodiment relates to a method of displaying images associated with weather near an aircraft. The method includes receiving radar returns associated with a radar antenna of the aircraft, and receiving data from a source remote from the aircraft. The method also includes displaying the images associated with the weather using at least a first color, a second color and a third color associated with a respective first precipitation rate or threat range, a respective second precipitation rate or threat range, and a respective third precipitation rate range or threat level. The first precipitation rate range or threat level is less than the second precipitation rate range or threat level and the third precipitation rate range or threat level is more than the second precipitation rate range or threat level. The images associated with the weather include at least a first image provided using the radar returns and a second image provided using the data from the source remote from the aircraft. The second image is provided at a range greater than a range of a path attenuation condition.

Another embodiment relates to a system comprising an electronic processor configured to provide the images of weather on a display according to any of the methods described above. Another embodiment relates to one or more non-transitory computer-readable storage media having instructions stored thereon that are executable by one or more processors to execute one or more of the methods described above.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting. As discussed below, the systems and methods can be utilized in a number of display devices for various types of applications or sensing systems.

Referring generally to the figures, systems and methods for providing visual representations of weather in proximity to an aircraft or other vehicle are provided. According to one embodiment, weather images are displayed even when sensing the weather is blocked by path attenuation condition. For example, an embodiment of the system and method described herein can advantageously display blocked cells using a source of weather data or information remote from the aircraft. The blocked cells can advantageously be depicted using display formats compatible with ARINC 453, and ARINC 661 avionic display platforms. The display of blocked cells advantageously gives pilots a more complete view of weather conditions.

In one embodiment, the images are displayable on at least one of navigation (NAV) displays, primary flight displays, electronic flight bag displays, tablets such as iPad® computers manufactured by Apple, Inc. or tablet computers, synthetic vision system displays, head up displays (HUDs), wearable displays, Google glasses, etc. In addition, the on-board sensed weather data and remote weather data can be synchronized before merging the data for display, according to one embodiment.

Figure 1:
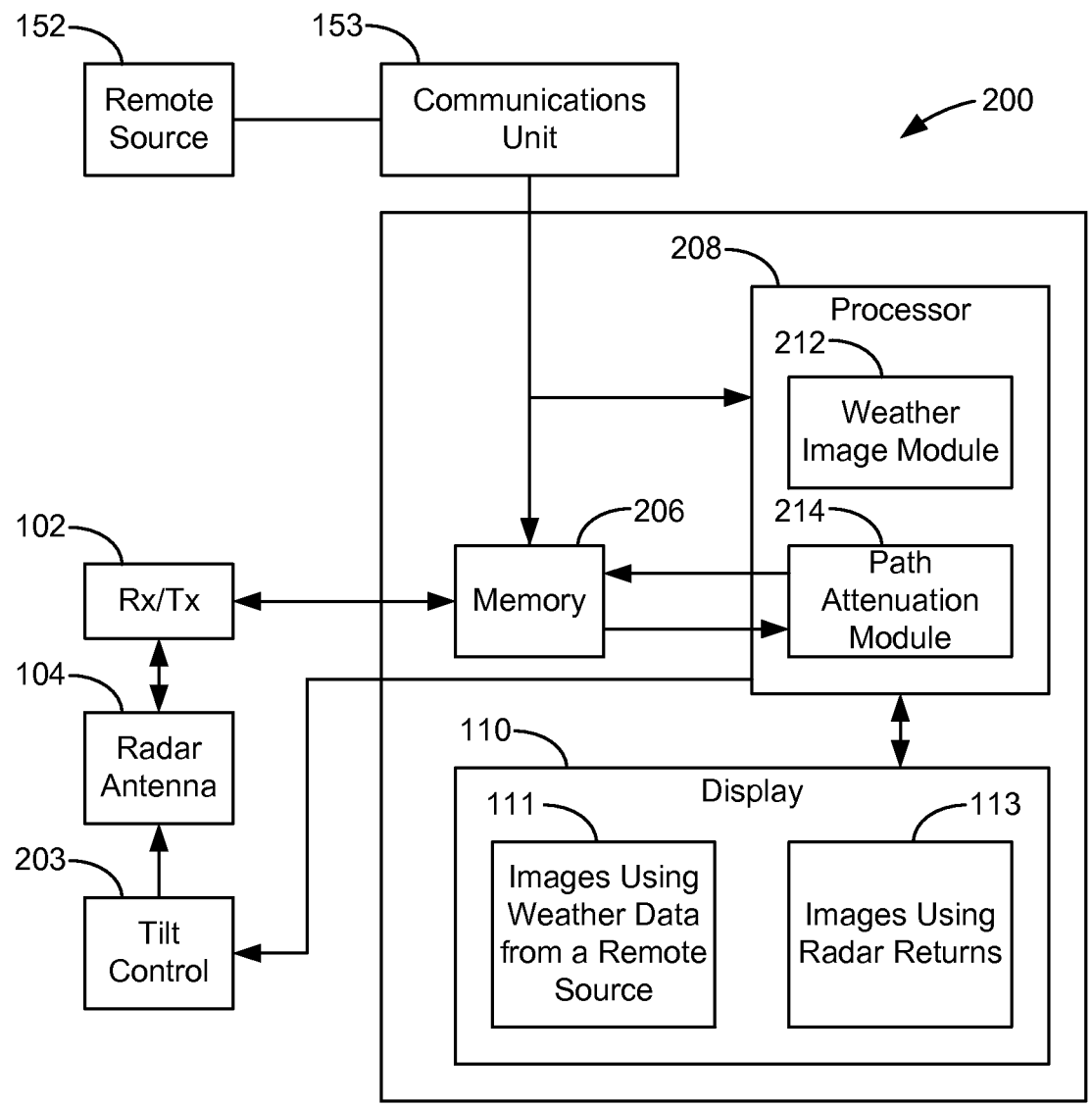
FIG. 1 is a general block diagram of an exemplary weather radar system that may be used, for example, on an aircraft according to an exemplary embodiment.
Figure 2:
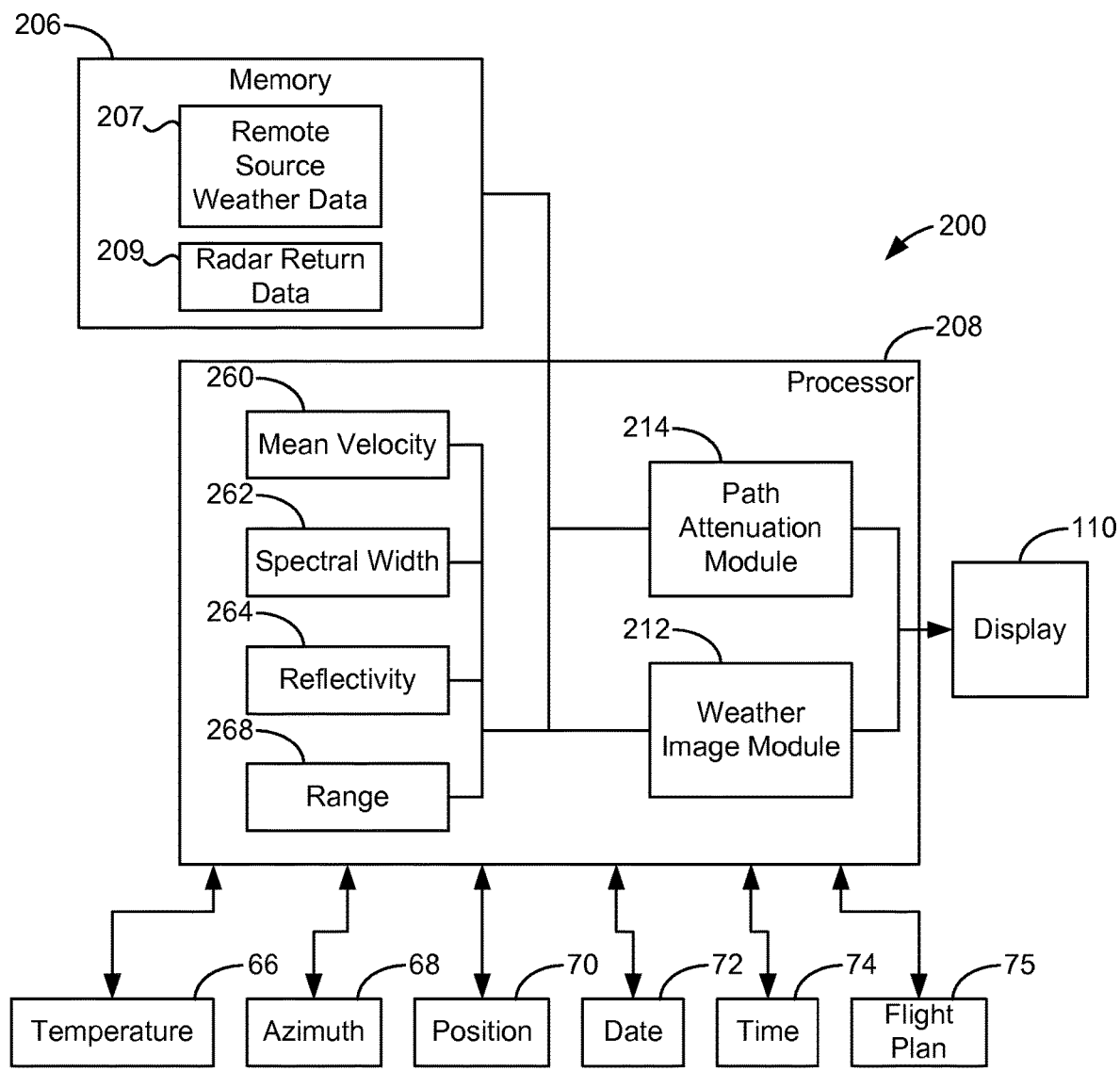
FIG. 2 is a more detailed block diagram of the weather radar system of FIG. 1 according to an exemplary embodiment.
Figure 3:
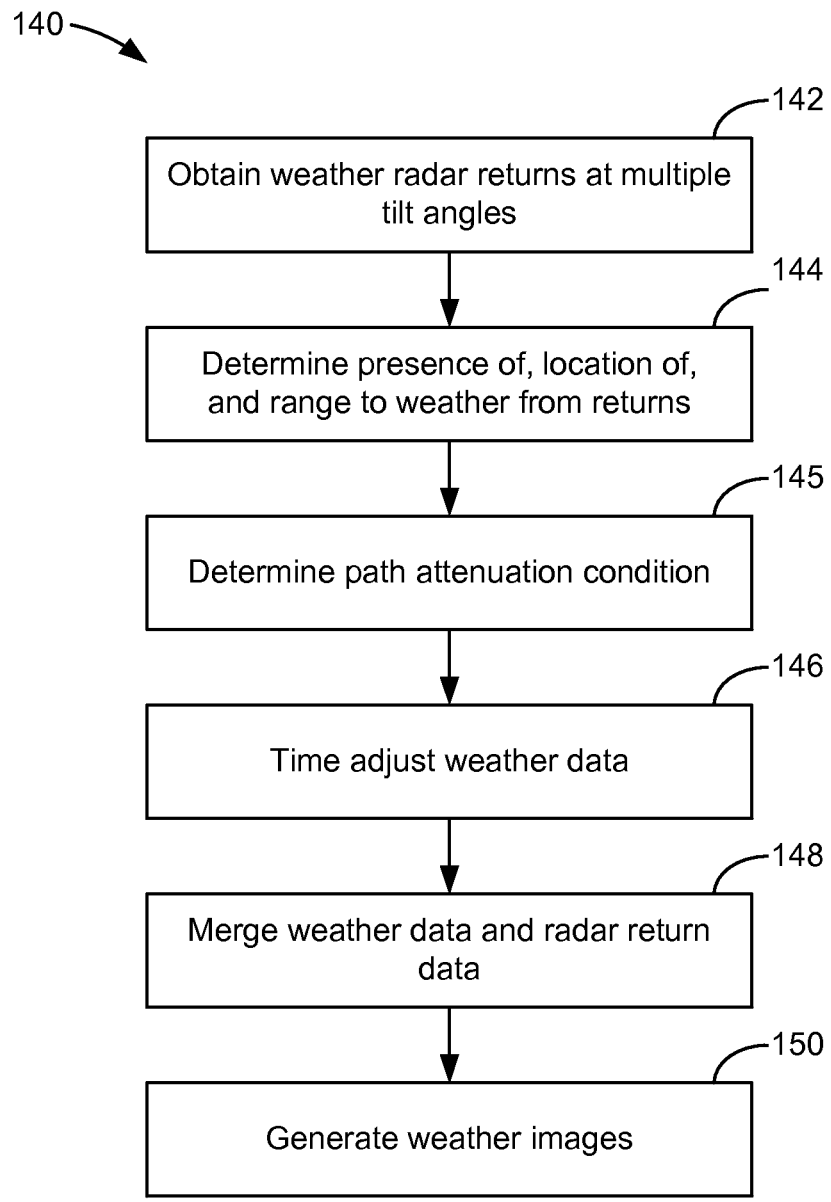
FIG. 3 is a flow diagram of an exemplary process for generating images of weather using the system illustrated in FIG. 1 according to an exemplary embodiment.

Referring generally to FIGS. 1 through 3, systems and methods that may be used to generate images of weather are shown and described according to exemplary embodiments. In some embodiments, only weather associated with radar returns received by a radar antenna onboard the aircraft are displayed when a path attenuation condition does not exist. Alternatively, weather data from a remote source can be merged with the weather associated with onboard weather radar return data and the merging algorithm can use a path attenuation factor to weight the data for the merging operation. In another embodiment, the merging operation can choose the remote data at ranges past the path attenuation condition over the data from onboard radar returns, or can choose the remote data at a range past the path attenuation condition on a radial basis over the data from onboard radar returns. According to another embodiment, weather within a threshold range is depicted using data derived from returns received onboard the aircraft, and weather outside of the threshold range is depicted using data from a remote source. Advantageously, systems and methods according to certain embodiments can utilize storm motion vectors from the information from the remote source (e.g., ground-based source) to adjust the position of the weather data from the remote source (e.g., NEXRAD data) to compensate for the delay. The data from the remote source can be differentiated visually from an onboard data as there may be residual error in what is presented in the data from the remote source.

Referring specifically to FIG. 1, a block diagram of a weather radar system 200 that may be used, for example, on a vehicle such as an aircraft is depicted according to an exemplary embodiment. In one embodiment, system 200 may be an avionics multi-scan, system manufactured by Rockwell Collins, such as the RTA-4218 MULTISCAN weather radar system or WXR-2100 weather radar system configured in accordance with the principles described herein. System 200 includes a weather image module 212 and a weather image module 214 in one embodiment. Modules 212 and 214 can be a circuit, module, software program or routine. Weather image module 212 advantageously determines the presence of weather at ranges and locations (and altitudes in certain embodiments) for display to the pilot of an aircraft.

Weather image module 212 may be used to create a spatially correct weather interpretation (e.g., weather images) that may be displayed in the range, altitude, and/or time domains. A combination of horizontal and selected vertical antenna beams may facilitate the collection of radar return data (IQ data) that can be used to compute parameters to construct an accurate weather model. The weather model may be altitude-based, and an estimate of the reflectivity based on radar returns may be obtained for any scan angle, range, and altitude combination. Weather image module 212 may store the altitude-based weather model in a memory 206, and the weather model may be used to extract weather information in a defined manner (e.g., based on user actions). Weather image module 212 can use data from remote source 152 and data from onboard the aircraft associated with radar returns received by radar antenna 104.

Avionics weather radar system 200 includes a weather radar receiver/transmitter 102, weather radar adjustable antenna 104, a processor 208, and a memory 206 (e.g., a multi-scan, multi-tilt angle memory) in one embodiment. System 200 also includes a tilt control 203 for automatically controlling the tilt angle (mechanical or electronic) of the antenna 104 in one embodiment; this auto control may include an additional manual control feature as well.

Memory 206 may be capable of storing in a readily addressable and rapidly retrievable manner at least two data sets resulting from two or more antenna sweeps at different angles. Memory 206 can include any type of machine-readable storage device capable of storing radar returns or associated data for analysis/processing by processor 208. In some embodiments, memory 206 can store parameters of a weather model. The data in memory 206 can represent factors for a mathematical relationship defining reflectivity as a function of altitude in one embodiment. The data in memory 206 can be used by path attenuation module 214 to determine whether a path attenuation condition exists. Although a multi-scan, multi-tilt scanning and data sets are described, it should be understood by one of ordinary skill in the art that a single scan of data may also be used in some embodiments.

Memory 206 can also be a three dimensional storage buffer for storing weather radar parameters according to X, Y and Z coordinates according to one embodiment. The storage of radar data and the form of the weather data stored therein is not disclosed in a limiting fashion. A variety of storage techniques for weather data can be used without departing from the scope of the invention.

Weather data from returns received by antenna 104 and weather data from remote source 152 can be stored in memory 206. The weather data can be based on received horizontal and/or vertical scans and from other aircraft or ground based sources. The weather data from remote source 152 can be received using a communications unit 153, such as a radio or other wireless communication device.

In some embodiments, the data may be stored as a mathematical equation representation of the information. The mathematical equation representation may be a piecewise linear function, piecewise nonlinear function, coefficients of a cubic spline, coefficients of a polynomial function, etc. that represent vertical representations of the weather based on the horizontal scan data and/or horizontal representation of the weather based on the vertical scan data. The function may be an equation based on weather parameters that may be sensor driven, model driven, a merger of sensor and model, etc. Although horizontal scan data is described, alternative embodiments may include X, Y Cartesian coordinates, rho/theta input, latitude and longitude coordinates, altitude, etc. Weather may be estimated for any required point in space with the vertical dimension being the subject of the weather equation.

Display 110 can be part of an avionic multi-function display (MFD) unit in one embodiment. In some embodiments, display 110 may be any of a variety of display types, such as a navigation display, an electronic flight bag, a tablet computing device, a synthetic vision system, a heads up display (HUD), a dedicated weather display, or another type of display system. In some embodiments, display 110 may be a remote display not included within a cockpit of the aircraft, such as a ground-based support display or remote display configured to display information regarding whether near an unmanned aerial vehicle (UAV).

Processor 208 may be included as part of a multi-scan, multi-tilt angle weather radar system and may perform the customary functions performed by a conventional weather radar return processing unit. Processor 208 may also perform several additional operations based upon the additional data and/or instructions provided in memory 206. In general, processor 208 can merge or cross qualify portions, or ranges, of the radar returns of several different antenna sweeps at several different tilt angles, so that a single, relatively clutter-free image may be presented to the pilot based upon the several separate scans. The radar returns may be processed by processor 208 to generate a three-dimensional weather profile of the weather near the aircraft.

System 200 may perform a scanning operation by transmitting at least two beams at different tilt angles. In some embodiments, system 200 may use a global positioning system (GPS), terrain database, or other tool to control the tilt control 203. Data obtained from the radar returns (e.g., reflectivity data) may be stored in memory 206. For example, known ground clutter may be removed from each of the returns using ground clutter suppression techniques.

Referring again to FIG. 1, in some embodiments, processor 208 may be configured to store parametric characteristics of the vertical extent of the weather in memory 206 instead of detecting and storing the entire reflectivity profile in a traditional three-dimensional memory. For example, since the radar knows current altitude and outside air temperature, processor 208 can be configured to estimate the altitude of the local atmospheric freezing layer. Further, processor 208 can estimate the height of the troposphere based on latitude, season, or more precise FMS data. Using this information and radar elevation scan data collected from scanning processes (e.g., normal MULTISCAN two-tilt or three-tilt processes), processor 208 may generate a linear fit of the reflectivity data from the ground to the freezing layer and another linear fit between the freezing layer and top of the troposphere.

Some embodiments may use more complex curve fits. Specific curve fits can be utilized depending on geographical location, time of day, time of year, etc. For example, over Europe, a linear curve fit may suffice to determine vertical reflectivity between freezing layer and troposphere height whereas a second order fit may be required over the equatorial Pacific. A tag can be given to each cell denoting the specific order of the data fit and, correspondingly, the method used to obtain vertical data from the stored parameters. As additional data is collected, perhaps through dedicated vertical scans of convective cells, the functions can be updated or increased in complexity in order to improve their accuracy.

Processor 208 may process weather radar returns to identify or sense the presence of weather in front of or in view of the aircraft. Weather image module 212 may utilize the altitude and the range to the weather to generate a vertical profile associated with the weather. Weather merge module 212 may scan across an array of azimuths to generate a three-dimensional weather profile of the weather near the aircraft, which may be stored for later presentation or immediately presented on display 110. Weather images can be displayed on either view screen 111 or 113 or both screen 111 and 113. Screens 111 and 113 plan view only displays in one embodiment. Although vertical profiles are discussed herein, system 200 includes embodiments that do not use vertical profile processing and/or that do not display vertical profiles.

In some embodiments, additional visual indicators other than the representation of weather are provided on screens 111 or 113. In some embodiments, a range and bearing matrix having range markers indicating distance from a current position of the aircraft and bearing markers indicating azimuths from a current flight path or bearing of the aircraft may be provided and may assist the pilot in cognitive recognition of weather features from the pilot's perspective.

With reference to FIG. 2, processor 208 can provide a mean velocity parameter 260 and a spectral width parameter 262 derived from weather radar returns. Alternatively, other types of velocity parameters can be utilized. In addition, processor 208 can provide a reflectivity parameter 264 and a range parameter 268 to circuit 212. Computed range or range parameter 268 along with scan angle position can be used to plot the position of weather on display 110. Processor 208 can also receive a temperature parameter 66, an azimuth 68, a position 70, a date 72, flight plan 75 and time 74. Alternatively, a separate temperature sensor 66 can be coupled to processor 208. Parameters 260, 262, 264, and 268 can be computed by processor 208 using data stored in memory 206.

Path attenuation module 214 receives weather radar returns associated with antenna 104 and determines whether a path attenuation condition exists. Module 214 can employ an algorithm similar to the algorithms employed in the RTA-4218 MULTISCAN™ radar system to determine whether X-band weather radar returns are experiencing a path attenuation condition. These algorithms generally determine whether returns beyond a range associated with large reflections have been too badly attenuated for compensation. If so, the path attenuation condition warning is provided.

In one embodiment, the path attenuation condition can be sensed when expected returns (e.g., noise returns) fall off rapidly. The path attenuation condition can be sensed on a radial basis. Alternatively, weather data from remote source 152 can be compared to weather data from radar returns received by radar antenna 104 to determine if a path attenuation conditions exists. For example, if there is a cell or storm at a particular range in a particular azimuth range according to remote data and the weather radar returns do not show any storms or cell beyond that particular range in the particular azimuth range, then path attenuation module 214 can determine that a path attenuation condition exists. Module 214 may consider whether a storm is in front of the missing storm from the remote data. Temporal correlation can be necessary in certain embodiments as returns received by antenna 104 generally provide more current data than weather data received via communications unit. In one embodiment, data from source 152 includes storm vector information, and the locations of the cells are adjusted with respect to time using the storm vector information.

If a path attenuation condition exists, weather image module 212 can utilize weather data from remote source 152 and radar returns to provide a screen 111 using weather data from a remote source. If a path condition does not exist, weather image module 214 can provide a screen 113 that provides images only using weather data derived from radar returns received on antenna 104. Screen 111 can include both images derived from weather data from remote source 152 and weather data derived from returns received an antenna 104. The images derived from weather data from remote source 152 and weather data derived from returns can be spatially correlated using time of sensing information and storm vector values. The storm vector values can be from a Nowcast or forecast weather data source such as the Corridor Integrated Weather System (CIWS) or Consolidated Storm Prediction for Aviation (COSPA) weather data source in one embodiment. Along with storm vector information, growth and decay information can be received, which may be used to increase or decrease the size, shape, and intensity of the weather data displayed in accordance with time in one embodiment.

Weather data stored in memory 206 can include weather data from remote source 152 (FIG. 1) and weather data associated with radar returns received an antenna 104. The weather data can include a time of sensing data and storm vector data for temporal and spatial correlation.

In one embodiment, if a path attenuation condition exists, weather image module 212 can utilize weather data from another aircraft or other onboard weather sources and radar returns associated with antenna 104 to provide a screen 111. The weather data can be from another weather radar source or data from the onboard weather radar system operating at a different frequency. The different frequency can be a millimeter frequency, a Ka band, frequency, a W band frequency etc. In other embodiments, the weather data can be from a non-radar airborne source (a LIDAR source, an infrared source, etc.).

With reference to FIGS. 1-3, processor 208 and weather image module 212 and path attenuation module 214 can utilize process 140 to provide images on display 110 in one embodiment. At a step 142, processor 208 receives weather data associated with weather returns at multiple tilt angles from antenna 104 in one embodiment. Alternatively, the radar returns do not have to be at multiple tilt angles in certain embodiments. At a step 144, weather image module 212 determines the presence of, location of, and range of weather from weather data derived from radar returns in one embodiment.

At a step 145, path attenuation module 214 determines if a path attenuation condition exists in one embodiment. At a step 146, if a path attenuation condition exists, weather data from remote source 152 are adjusted for spatial and temporal correlation in accordance with one embodiment. At a step 148, the weather data from remote source 152 and weather data derived from radar returns from antenna 104 are merged in one embodiment. At a step 150, weather images are generated using the merged data in one embodiment.

If a path condition does not exist at step 145, weather images can be generated at step 150 using only return data from radar returns received by radar antenna 104 in one embodiment. In one embodiment, a path attenuation factor can be utilized to select weather data for merging. The weather data from source 152 can be merged with the radar return data to create weather images in one embodiment. For example, if the attenuation factor indicates substantial attenuation at a particular azimuth and range, weather images can be provided using a greater percentage of data form source 152 at that range in one embodiment. If the attenuation factor indicates a complete path attenuation condition, then the data from source 152 is entirely used to provide the image at that range and azimuth in one embodiment. Further, data can be merged in accordance with its temporal standing. More recent data is given preference over older data in one embodiment. In one embodiment, images are provided using data from source 152 at ranges beyond a threshold range, and images are provided using data from radar returns received by antenna 104 at ranges below the threshold range.

Processor 208 and weather image module 212 cause display 110 to display areas associated with weather data from remote source 152 differently than weather images derived from radar returns from antenna 104 in one embodiment. Weather images using data from remote source 152 can be displayed using outlines, cross-hatching, uniformly organized speckles, etc. The outlines, cross-hatching and speckles can have red, yellow, or green color according to standard precipitation rates in one embodiment. In one embodiment, the cross-hatched regions are provided with a background color corresponding to the precipitation rate and a line color for the cross hatching differs from the background color.

The speckled pattern or cross hatched regions can either be bounded (e.g., outlined) or unbounded and can have a variety of shape profiles including rounded or straight edges in one embodiment. The speckles can vary in shape and size to represent age of data in one embodiment. The cross hatching can also vary in thickness to represent age of data in one embodiment. According to another embodiment, boundary color can be the same or different as the speckled colors. According to another embodiment processor 208 and weather image module 212 cause display 110 to display areas associated with weather data from remote source 152 as outlined regions without cross hatching and speckles in one embodiment.

In some embodiments, process 140 may be implemented using instructions stored on a machine-readable medium (e.g., memory 206) and executed on a processor (e.g., processor 208). Processor 208 may be configured to operate system 200 as a pulse Doppler multi-scan, multi-tilt angle radar system or a volumetric radar system in which radar beams are produced at more than one tilt angle. Processor 208 receives radar returns through receiver/transmitter circuit 102.

Processor 208 can receive the radar returns (or signals/data related thereto) directly or through memory 206 at a step 142. Receiver/transmitter circuit 102 can be a single path or can have separate circuits for a receive path and a transmit path. Processor 208 may determine power associated with the radar returns.

Figure 4:
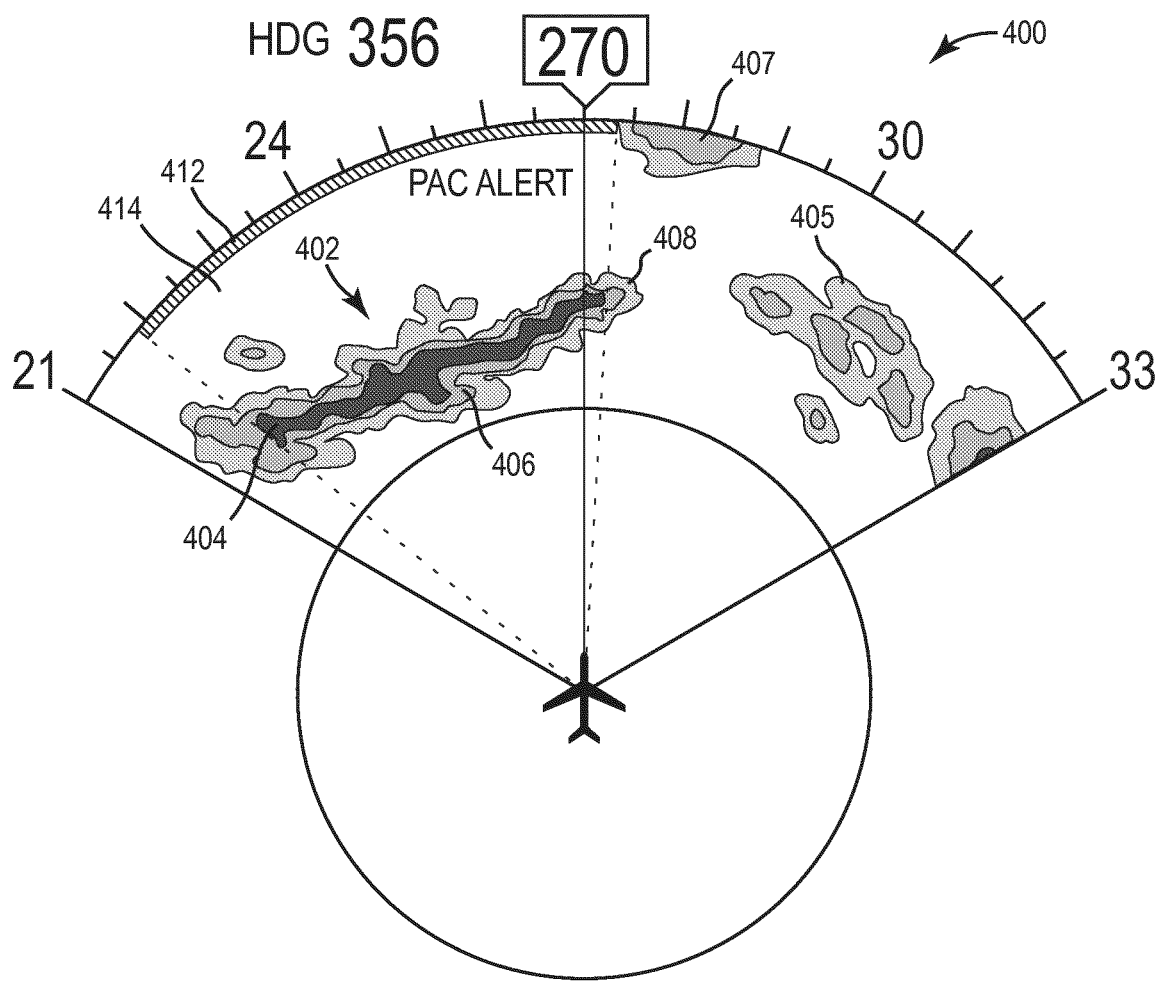
FIG. 4 is a drawing of a screen including display images of weather on a conventional display.

With reference to FIG. 4, a conventional screen (or portion thereof) displays weather images 402 on a screen 400. Images 402 have a first color 404, a second color 406 and a third color 408. Colors 404, 406 and 408 symbolize a respective precipitation rainfall rate range and can be red, yellow and green respectively. Weather images 405 and 407 are displayed in a fashion similar to weather images 402.

A PAC alert is provided on screen 400 as a bar 412 as well as a textual message 414 stating the term "PAC ALERT". Bar 412 indicates the radials through which the path attenuation condition exists and is provided on a range arc 416 with azimuth indications. Accordingly, the pilot is aware that additional storms may exist beyond the range of weather images 402. Since bar 412 is not provided behind weather images 405 which are displayed in a similar fashion to weather images 402, the pilot knows that weather does not exist beyond the range of weather images 405.

Figure 5:
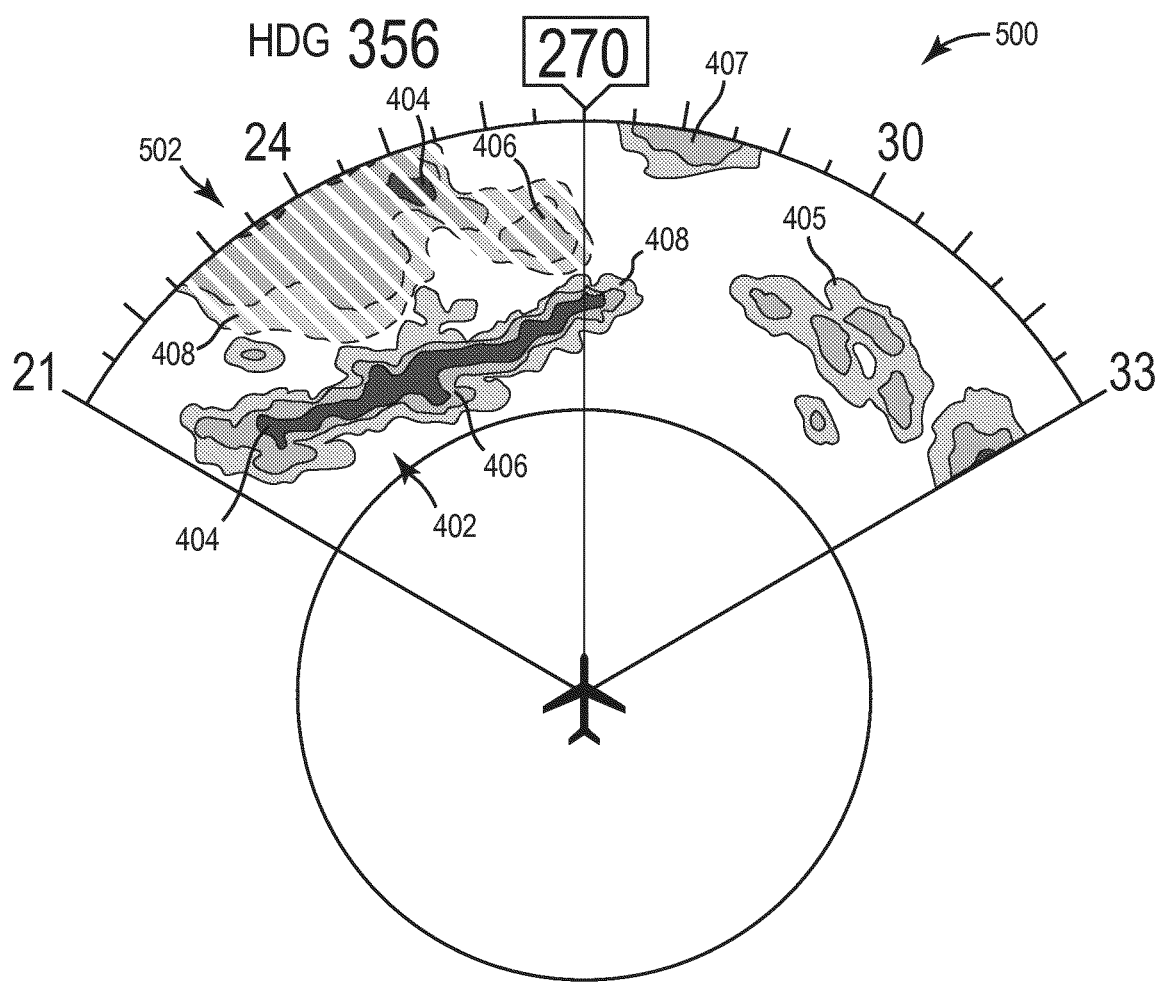
FIG. 5 is a drawing of a screen including display images of the weather illustrated in FIG. 4 provided by the system illustrated in FIG. 1 including images derived from weather data from an outside source during a path attenuation condition according to an exemplary embodiment.

With reference to FIG. 5, a screen 500 or portion of a screen is provided by system 200 in one embodiment. Weather images 502 are provided behind weather images 402 (further in range from the aircraft). Weather 502 is generated by weather image module 212 in response to weather data from remote source 152. Weather 502 is cross-hatched and includes colors 404, 406 and 408 as background in one embodiment. The line color for the cross hatching can be white, black or another color. Weather images 405 and weather images 407 on screen 500 are not different from their depiction in screen 400 because the path attenuation condition is not associated with the radials corresponding to images 405 and 407. Advantageously, system 200 allows weather images 502 to be viewed by the pilot despite a path attenuation condition due to the weather associated with images 402. In one embodiment, colors 404, 406 and 408 in FIGS. 6-8 can represent a threat level or range.

Figure 6:
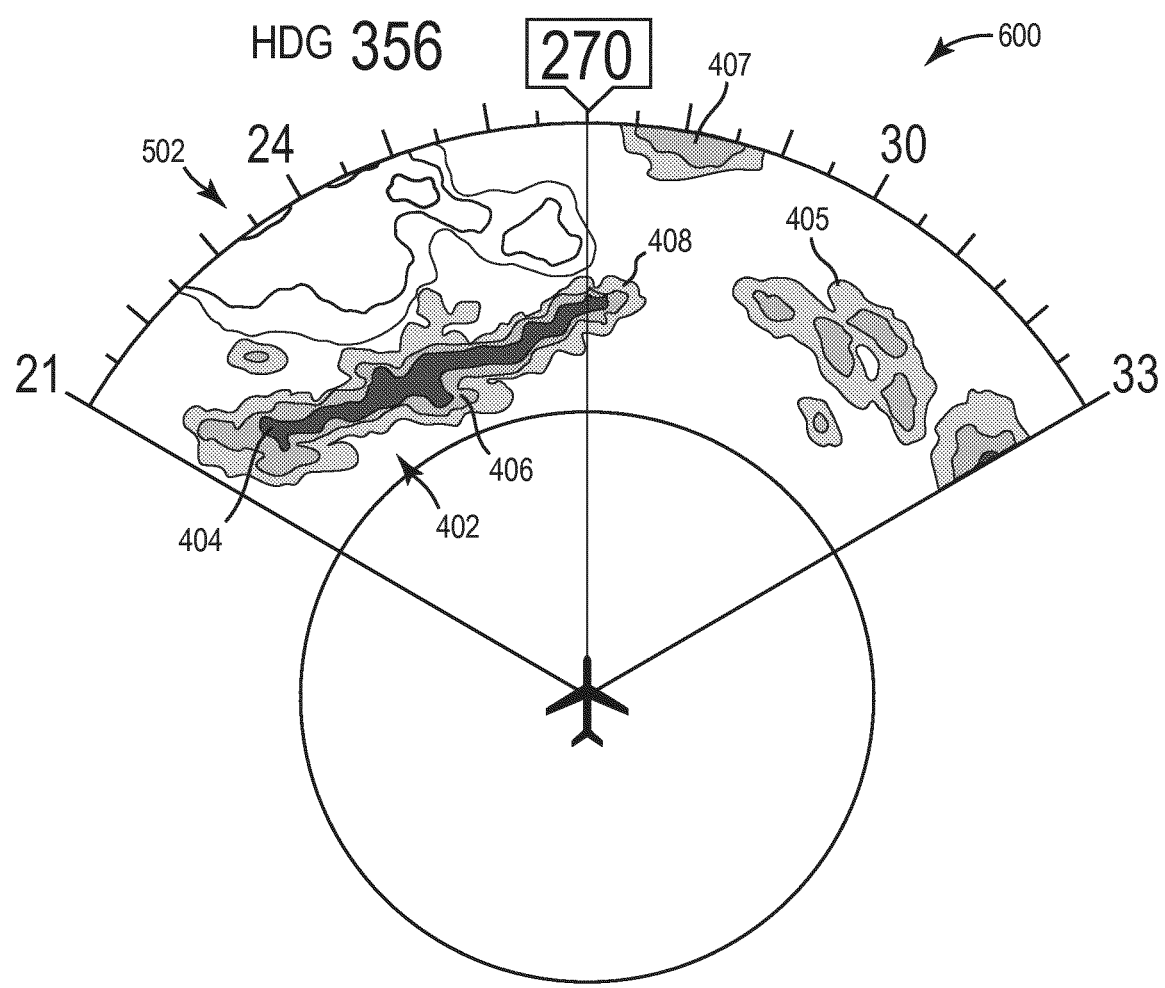
FIG. 6 is a drawing of a screen including display images of the weather illustrated in FIG. 4 provided by the system illustrated in FIG. 1 including images derived from weather data from an outside source during a path attenuation condition according to another exemplary embodiment.

With reference to FIG. 6, a screen 600 or portion of a screen is provided by system 200 in one embodiment. Screen 600 includes weather images 402, 405, and 602. Weather images 602 correspond to weather images 502 on screen 500 and are shown in an outline form indicating that weather images 602 are provided from data from remote source 152 according to one embodiment. The outline can be color coded to indicate precipitation rates using red, yellow and green according to one embodiment. Weather images 402, 405 and 407 are displayed as on screens 400 and 500 in FIGS. 4 and 5.

Figure 7:
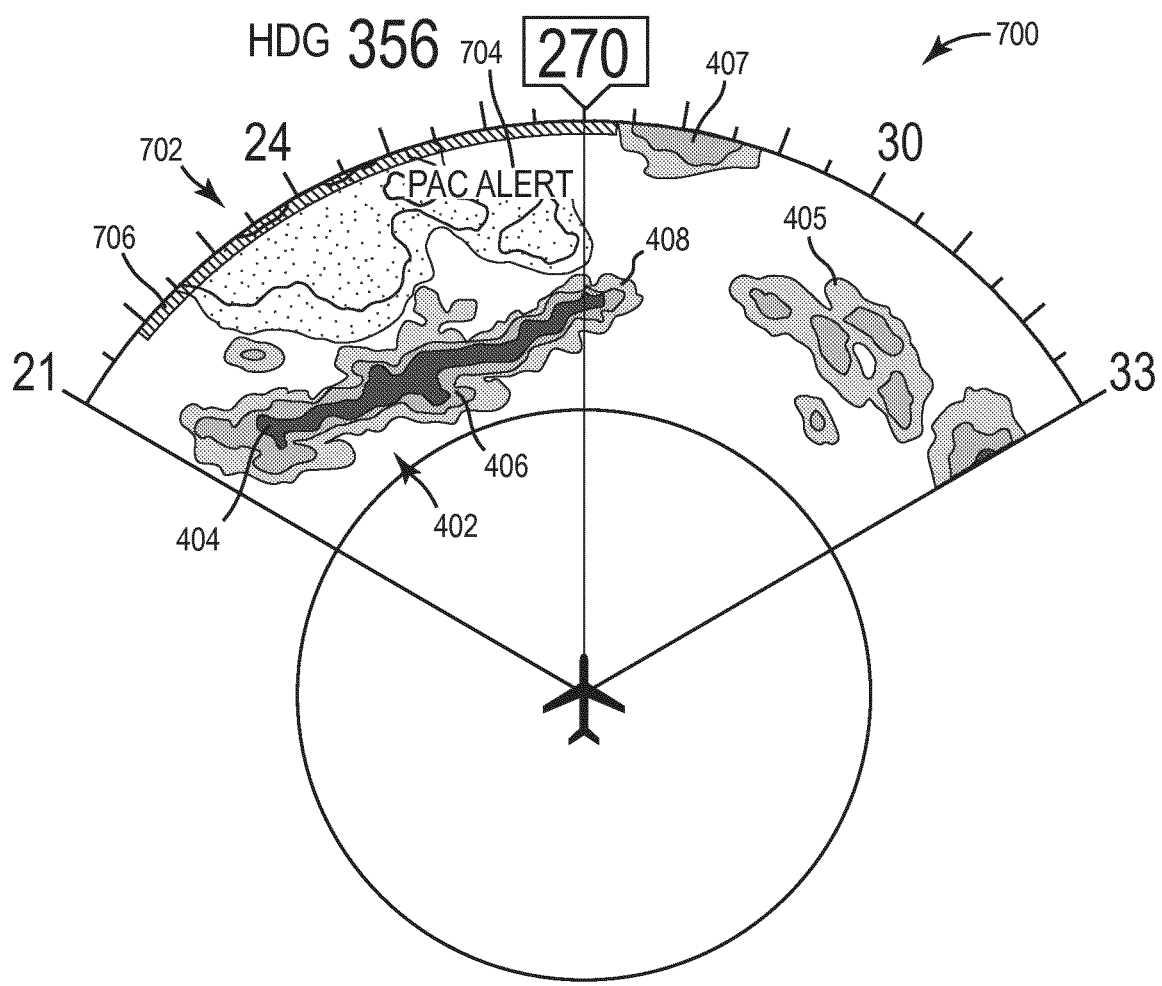
FIG. 7 is a drawing of a screen including display images of the weather illustrated in FIG. 4 provided by the system illustrated in FIG. 1 including images derived from weather data from an outside source during a path attenuation condition according to another exemplary embodiment.

With reference to FIG. 7, a screen 700 or portion of a screen is provided by system 200 in one embodiment. Screen 700 includes weather images 402, 405, and 702. Weather images 702 correspond to images 502 and are shown as speckled regions indicating that weather images 502 are derived from data from remote source 152 according to one embodiment. The speckles can be color coded to indicate precipitation rates using red, yellow and green according to one embodiment. Weather images 402, 405 and 407 are displayed as on screens 400 and 500 as in FIGS. 4 and 5.

Screen 700 can also include a PAC Alert message 704 and/or a bar 706 indicating the radials affected by the path attenuation condition according to one embodiment. Bar 706 can be yellow or another appropriate color. Bar 706 can be provided on the outer most range arc in one embodiment. Message 704 and bar 706 can also be used on screens 500 and 600 according to one embodiment.

Figure 8:
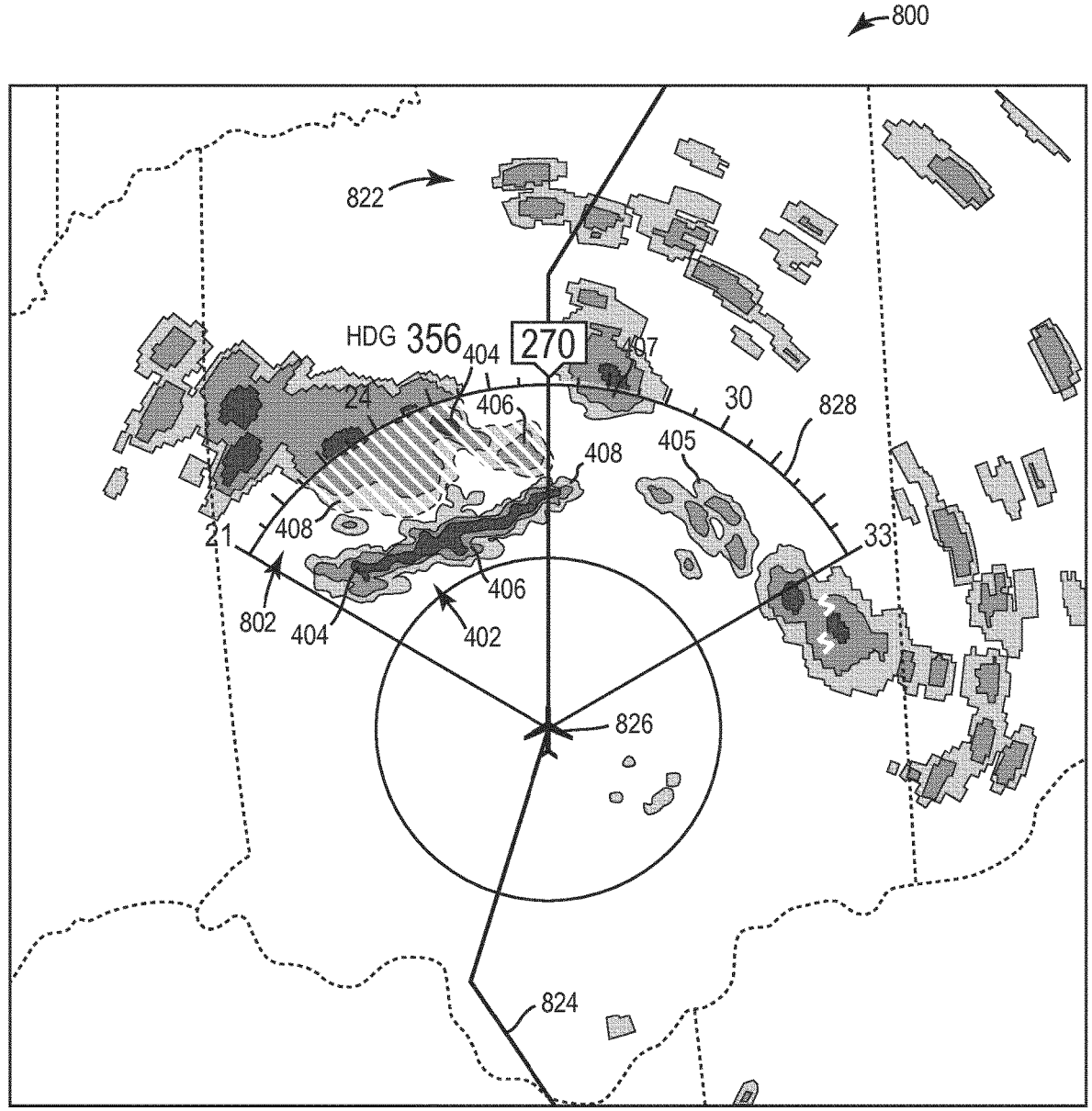
FIG. 8 is a drawing of a screen including display images of the weather illustrated in FIG. 4 provided by the system illustrated in FIG. 1 including images derived from weather data from an outside source during a path attenuation condition according to another exemplary embodiment.

With reference to FIG. 8, a screen 800 is provided by system 200 in one embodiment. Screen 800 includes weather images 402, 405, and 802. Screen 800 includes a range marker 828. Marker 828 can be a 100 nautical mile (nm) range arc or marker from the aircraft as represented by symbol 826. Alternatively, marker 828 can indicate other ranges including ranges selectable by the pilot. A numerical indicator can be provided at a left end of marker 828 to indicate the current range. Screen 800 also includes weather images 822 at range greater than the range represented by marker 828 in one embodiment. Marker 828 can provide delineation between weather images 822 and weather images 402, 405, and 802. U.S. Pat. No. 6,441,773 assigned to the assignee of the present application and incorporated herein by reference shows exemplary displays using a delineation marker between types of weather data.

Weather images 802 correspond to images 502 and are configured to indicate that weather images 802 are derived from data from remote source 152 according to one embodiment. Weather images 402, 405 and 407 are displayed as on screens 400 and 500 as in FIGS. 4 and 5.

Weather images 822 are derived from data from source 152. In one embodiment, system 200 uses data from source 152 at greater ranges because weather is best sensed via radar antenna 104 at shorter ranges (e.g., 60 nm, 80 nm, and 100 nm) in one embodiment. In another embodiment, system 200 uses data from source 152 for areas outside the azimuth capabilities of antenna 104. Data from returns received by antenna 104 are updated much more rapidly than outside sources like NEXRAD sources. Weather images 822 can be derived from data from outside source 152 at greater ranges because the relevant weather can be sampled more accurately via antenna 104 as the aircraft comes closer to it as the aircraft travels along flight path 824. The locations of weather images 822 can be adjusted in accordance with time and vector parameters in one embodiment. Screen 800 can also include a PAC Alert message 704 and/or a bar 706 indicating the radials affected by the path attenuation condition on marker 820 according to one embodiment. Weather image module 212 can merge the weather data from source 152 with the radar return data associated with antenna 104 by using a threshold range or greater to choose the weather data from source 152 and choosing the weather data from source 152 when a path attenuation condition exists to create screen 800 in one embodiment. In one embodiment, a zone around marker 828 can define an area where merged data is used to provide weather images. In one embodiment, the merged data includes radar return data and data from source 152, each weighted according to its range from the aircraft where radar return data is more heavily weighted the closer it is to the aircraft. The weather images in the merged data area can be configured similar to images 502, 602, 702, or 802. In one embodiment, weather images 822 can be depicted at a lower brightness, luminance or intensity level or similar to images 502, 602, 702, or 802 to indicate they are derived from data from outside source 152. In one embodiment, the brightness, luminance or intensity level is varied to represent the age of data associated with images 822.

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system. No claim element herein is to be construed under the provisions of 35 U.S.C. § 112, sixth paragraph, unless the element is expressly recited using the phrase "means for." Furthermore, no element, component or method step in the present disclosure is intended to be dedicated to the public, regardless of whether the element, component or method step is explicitly recited in the claims.

As noted above, embodiments within the scope of the present disclosure include program products comprising machine-readable storage media for carrying or having machine-executable instructions or data structures stored thereon. Such machine-readable storage media can be any available media which can be accessed by a general purpose or special purpose computer or other machine with a processor. By way of example, such machine-readable storage media can comprise RAM, ROM, EPROM, EEPROM, CD ROM or other optical disk storage, magnetic disk storage or other magnetic storage devices, or any other medium (e.g., non-transitory medium) which can be used to carry or store desired program code in the form of machine-executable instructions or data structures and which can be accessed by a general purpose or special purpose computer or other machine with a processor. Combinations of the above are also included within the scope of machine-readable storage media. Machine-executable instructions comprise, for example, instructions and data which cause a general purpose computer, special purpose computer, or special purpose processing machine to perform a certain function or group of functions.

Embodiments of the disclosure are described in the general context of method steps which may be implemented in one embodiment by a program product including machine-executable instructions, such as program code, for example, in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present disclosure may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, servers, minicomputers, mainframe computers, and the like. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include a general purpose computing device in the form of a computer, including a processing unit, a system memory, and a system bus that couples various system components including the system memory to the processing unit. The system memory may include read only memory (ROM) and random access memory (RAM) or other non-transitory storage medium. The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules, and other data for the computer.

It should be noted that although the flowcharts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A method of displaying images of weather near an aircraft, the aircraft receiving radar returns through a weather radar antenna of the aircraft, the method comprising:
sensing a path attenuation condition using the radar returns;
wherein the path attenuation condition is sensed by determining when expected returns fall off rapidly; and
displaying the images of the weather using an outside source and the radar returns in response to sensing the path attenuation condition;
wherein the images of the weather associated with the outside source are displayed as a pattern, the pattern based on a characteristic of the weather;
wherein components of the pattern have a display characteristic based on a time of sensing the weather by the outside source.

2. The method of claim 1, wherein the images of the weather associated with the outside source are displayed to have an outline.

3. The method of claim 1, further comprising:
displaying a line at a range associated with the path attenuation condition, the line configured to alert a viewer of a display.

4. The method of claim 1, wherein the components of the pattern are uniformly distributed.

5. The method of claim 1, wherein the display characteristic comprises at least one of a size, shape, intensity, thickness, intensity, brightness, and luminance.

6. The method of claim 1, wherein the images of the weather displayed using the outside source are positioned on a display based on a motion vector and growth and decay information and the time of sensing the weather.

7. The method of claim 6, wherein the motion vector and growth and decay information and the time of sensing the weather is used to compensate for a delay time associated with receiving information regarding the weather from the outside source.

8. An avionic weather radar system, comprising:
a processor composing a path attenuation module and a weather image module, wherein the path attenuation module is configured to determine a path attenuation condition using characteristics of radar returns received via a radar antenna onboard an aircraft in response to a presence of the path attenuation condition and wherein the path attenuation module is configured to cause images of weather to be displayed using a second source and the radar returns, wherein the weather is displayed within a boundary of the path attenuation condition using information from the second source based on the path attenuation condition being sensed, wherein the images of the weather associated with the second source have a display characteristic indicating that the images of the weather associated with the second source are based on the information from the second source, and wherein the display characteristic varies based on a time of sensing the weather.

9. The system of claim 8, further comprising:
a display for displaying the images of the weather.

10. The system of claim 8, wherein the weather is displayed using at least a first color, a second color, and a third color associated with a respective first precipitation rate range or threat level, a respective second precipitation rate range or threat level, and a respective third precipitation rate range or threat level, wherein the first precipitation rate range or threat level is less than the second precipitation rate range or threat range and the third precipitation rate range or threat level is more than the second precipitation rate range or threat level.

11. The system of claim 8, wherein the processor further provides a textual message indicating detection of the path attenuation condition.

12. The system of claim 10, wherein the processor further provides an arc across an azimuth range of the path attenuation condition.

13. The system of claim 12, wherein the arc across the azimuth range of the path attenuation condition includes azimuth indications.

14. The system of claim 8, wherein weather images beyond a particular range are displayed using data from the second source, the second source being an off aircraft source.

15. The system of claim 8, wherein the second source comprises another aircraft, a ground-based radar system, a LIDAR source, an infrared source, or a data source storing weather data from second radar returns having a different frequency than the radar returns received via the radar antenna onboard the aircraft.

16. The system of claim 8, wherein the processor is further configured to sense the path attenuation condition by determining an area where expected radar returns rapidly fall off.

17. The system of claim 8, wherein the processor is further configured to sense the path attenuation condition by detecting a storm or cell at a particular azimuth range and determining that radar returns do not indicate a presence of a storm or cell beyond the particular azimuth range.

18. A method of displaying images associated with weather near an aircraft, the method comprising:
receiving radar returns associated with a radar antenna of the aircraft;
sensing a path attenuation condition, wherein the path attenuation condition is sensed by determining when expected returns fall off rapidly;
receiving data from a source remote from the aircraft; and
displaying the images associated with the weather, wherein the images associated with the weather comprise a first image provided using the radar returns and a second image provided using the data from the source remote from the aircraft, wherein the second image is provided at a range greater than a range of the path attenuation condition, wherein the second image has a display characteristic indicating that the second image is based on the data from the source remote from the aircraft.

19. The method of claim 18, wherein the display characteristic comprises a boundary of the path attenuation condition.

20. The method of claim 18, wherein the data from the source remote from the aircraft is weather data provided from a remote aircraft or from a NEXRAD source.

* * * * *